United States Patent [19]

Vakhidov et al.

[11] 3,964,984

[45] June 22, 1976

[54] METHOD OF PRODUCING PHOTOCHROMIC SODALITE CRYSTALS

[76] Inventors: Shavkat Vakhidov, ulitsa Beruni, 3, kv. 2; Mokhira Akhadovna Vakhidova, ulitsa Lenina, 11, kv. 14, both of poselok Ulugbek, Tashkentskaya oblast; Anatoly Nikolaevich Lobachev, ulitsa Fersmana, 3, kv. 68, Moscow; Oleg Konstantinovich Melnikov, Profsojuznaya ulitsa, 111, korpus 3, kv. 228, Moscow; Nina Sergeevna Triodina, Universitetsky prospekt, 4, kv. 501, Moscow, all of U.S.S.R.

[22] Filed: Jan. 24, 1973

[21] Appl. No.: 326,338

[30] Foreign Application Priority Data

Feb. 4, 1972 U.S.S.R............................. 1739751

[52] U.S. Cl. ....................................... 204/157.1 H
[51] Int. Cl.² ............................................ B01J 1/10
[58] Field of Search ........................... 204/157.1 H

[56] References Cited
UNITED STATES PATENTS
3,445,209   5/1969   Asunmaa ........................ 204/157.1

OTHER PUBLICATIONS
Ballentyne et al., J. Phys. D., vol. 3, No. 10, (1970).

*Primary Examiner*—Howard S. Williams

[57] ABSTRACT

A method of producing photochromic sodalite, comprising exposing sodalite crystals to the effect of a penetrating ionizing radiation field for a sufficient time necessary to activate the photochromic centers in the sodalite crystals.

5 Claims, No Drawings

METHOD OF PRODUCING PHOTOCHROMIC SODALITE CRYSTALS

The present invention relates generally to methods of producing photochromic materials and more specifically it is concerned with the methods of producing photochromic sodalite crystals.

The necessity for photochromic materials has been brought about by the development of holography, three-dimensional television and computer memory. Polycrystalline photochromic sodalite is currently used for coating the screens of cathode-ray-image-storing tubes. Large single crystals of the photochromic sodalite (up to a few cubic centimeters) may open up a new way for recording three-dimensional holograms and the development of optical memory cells.

At present a method for activating photochromic centres in sodalite crystals is known, whereby fine-crystalline sodalite powder is calcinated in a reducing atmosphere at 1050°C.

The disadvantages inherent in said method are as follows:
a. a high temperature;
b. the need for a specific (reducing) atmosphere;
c. the failure to produce large single photochromic sodalite crystals, since those available at present are not free from water which is liable to burst the crystals at 600°C.

Another method of producing photochromic sodalite is also known heretofore, wherein the fine-crystalline sodalite contains an indispensable admixture of sulphur ions, and is calcinated in a hydrogen atmosphere at 800°–900°C. Said method, however, likewise suffers from some disadvantages such as:
a. an indispensable doping of an admixture;
b. the need for hydrogen atmosphere;
c. relatively high temperatures are involved;
d. the failure to produce large crystals of photochromic sodalite.

A method which is considered to be most proximate to the present invention is one of producing photochromic sodalite crystals (D. W. G. Ballentyne, L. Bye, J. Phys. D., 3, No. 10, 1970), whereby the photochromic centres in sodalite crystals are activated by bombarding the crystals containing an indispensable admixture of chlorine ions with electrons under a voltage of 100 kV. The method, however, succeeded in activating the photochromic centres in the superficial layer only (to a depth of only a few microns); and it failed to produce large single crystals of the photochromic sodalite and it utilizes the indispensable admixture of the chlorine ions.

Thus, all of the known methods for producing photochromic sodalite fail to produce large crystals thereof and require either a high temperature and a specific (inert) atmosphere or the introduction of dopes for stimulating the activation of the photochromic centres.

It is therefore an essential object of the present invention to provide a method of producing photochromic sodalite crystals that is instrumental in producing large single crystals of photochromic sodalite, which neither involve the introduction of stimulating dopes, nor use of high temperatures a specific atmosphere during the treatment.

This said object is accomplished due to the fact that in a method of producing photochromic sodalite crystals, wherein sodalite crystals are exposed to the effect of an ionizing radiation field for a period of time necessary to activate the photochromic centres therein (inducing an absorption band within a 530-nm range), and according to the invention a penetrating ionizing radiation as the ionizing radiation is used.

X-rays may also be used as the ionizing radiation.

For large and heavy sodalite specimens a severe electromagnetic radiation should be used as the penetrating ionizing radiation, viz., $\gamma$-rays which possess high penetrability; besides, no residual activity has been observed in the specimens which have been irradiated by said rays.

Also fast nuclear particles such as neutrons, protons, high-speed electrons, and $\alpha$-particles may likewise be employed as the ionizingg radiation.

Such methods provide for the production of large-photochrome sodalite single crystals, which involves no indispensable admixtures, nor the use of high temperatures or any particular atmosphere.

To promote a better understanding, specific exemplary embodiments of the method disclosed in the present invention are given herein below.

EXAMPLE 1

A single crystal of synthetic hydrosodalite, free from intentionally introduced dopes and measuring 20×20×20 mm, was exposed to the effects of a field of $\gamma$-radiation from a $Co^{60}$ isotope having a radiation power of 3000 r/s. The source of the $\gamma$-radiation was cylinder-shaped with a diameter of 80 mm and a height of 500 mm. A number of cobalt sources were arranged around the cylinder. The sodalite specimen under irradiation was placed at the centre of the cylinder. The specimen was kept under the effect of the $\gamma$-radiation field at 70°C for a period of 42 hours. As a result, the photochromic centres were found to have been uniformly activated within the entire bulk of the sodalite single crystal, whereas the colour density at a maximum absorption band of 530 nm was equal to D=40.

EXAMPLE 2

A plate of natural sodalite measuring 10×10×1 $mm^3$ was exposed to the effects of an X-ray field. Irradiation was carried out on an X-ray apparatus using W-radiation, under a voltage of 60 kV, an amperage of 20 mA and with a radiation power of 200 r/s. The plate was positioned close to the aperture of the X-ray tube. An absorption band having a maximum of 530 nm and a colour density of D = 1.6 was found to induce for a period of 70 hours at room temperature.

EXAMPLE 3

Polycrystalline sodalite having a crystal size of not over 50 mcm was placed in the field of a $\gamma$-radiation source similar to that described in Example 1. As a result, the sodalite powder became red in color which is indicative of the activation of the photochromic centres.

EXAMPLE 4

A monocrystalline plate of synthetic sodalite 1 mm thick was placed in a reactor having a neutron flux power of $1.8 \cdot 10^{13}$ n/s.$cm^2$. An absorption band with a 530 nm maximum was being induced in the original crystal for a period of 23 hours at 40°C (the crystal became red in color) until it had a colour density of D=2. In this case the crystal was activated largely due to the effect of the $Na^{24}$ isotope which has a half-life of 15 hours; that is why the sodalite crystal, after having been irradiated, was held up in a lead decay chamber until the permissible dose was absorbed.

EXAMPLE 5

A sodalite single crystal 0.3 mm thick was irradiated by electrons in a linear electronic accelerator under a voltage of 150 keV, with an integrated electron flux being equal to $10^{15}$ $\beta/cm^2$. As a result, the photochromic centres were found to have become activated within the whole crystal bulk for a period of 10 hours at room temperature.

EXAMPLE 6

A sodalite plate 1 mm thick was irradiated in a cyclotrone with a power of 18 MeV and an average proton flux density of $6.10^{12}$ p/scm$^2$. 12 minutes were needed for activation of the photochromic centres in the entire bulk of the crystals.

EXAMPLE 7

A sodalite single crystal 10 mcm thick was placed in a field of $\alpha$-particles having a power of 5.15 MeV, with the flux of the $\alpha$-particles being equal to $10^3$ $\alpha/mm^2$.-min. The photochromic centres were found to have become activated in the entire bulk of the crystal for a period of 24 hours.

What is claimed is:

1. A method of producing photochromic sodalite crystals which comprises exposing sodalite crystals to the effects of a penetrating ionizing radiation field in a chlorine-free atmosphere for a period of time necessary for the activation of the photochromic centers in said crystals.

2. A method of producing photochromic sodalite crystals as claimed in claim 1, wherein said crystals are exposed to the effects of a severe electromagnetic radiation field.

3. A method of producing photochromic sodalite crystals as claimed in claim 1, wherein said crystals are exposed to the effects of a fast moving nuclear-particle field.

4. The method of producing photochromic sodalite crystals as claimed in claim 1, wherein the crystals are exposed to the effects of $\gamma$-rays.

5. The method of producing photochromic sodalite crystals as claimed in claim 1, wherein the said crystals are exposed to effects of X-rays.

* * * * *